Aug. 25, 1964     N. H. GEROUX     3,145,883
POWDER MEASURING DEVICE
Filed Nov. 6, 1961
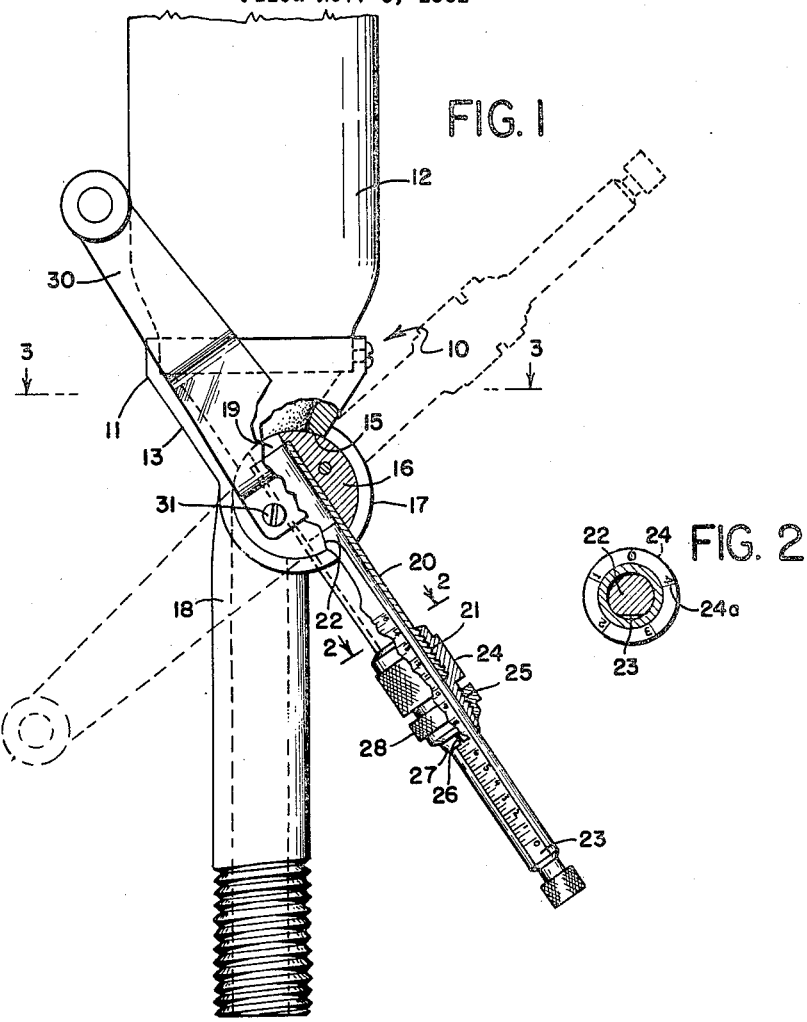
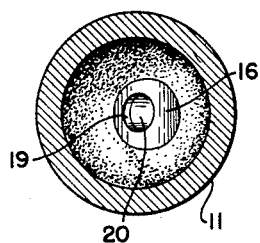
*INVENTOR.*
NAPOLEON H. GEROUX
BY
*Williamson & Palmatier*
ATTORNEYS

United States Patent Office 3,145,883
Patented Aug. 25, 1964

3,145,883
POWDER MEASURING DEVICE
Napoleon H. Geroux, Minneapolis, Minn., assignor to Herter's, Inc., Waseca, Minn., a corporation of Minnesota
Filed Nov. 6, 1961, Ser. No. 150,342
1 Claim. (Cl. 222—306)

This invention relates to a powder measuring device and more particularly relates to an apparatus for measuring a desired quantity of powder by volume.

In the past, powder measuring devices have been known which measure a desired quantity of powder by volume. However the prior art devices have had distinct disadvantages, and one of the primary disadvantages is the inability of such previously known devices is to measure to a considerable degree of accuracy while allowing the measuring device to be readily adjustable so as to allow small variations in the quantity being measured.

With these comments in mind, it is to the elimination of these and other disadvantages to which the present invention is directed, along with the inclusion therein of other novel and desirable features.

An object of my invention is to provide a new and improved powder measuring device of simple and inexpensive construction and operation.

Another object of my invention is the provision of a novel powder measuring device wherein small variations in the amount of powder being measured can be made with a substantial degree of accuracy.

A further object of my invention is the provision of a new and novel powder measuring device which is adapted to measure varying types of powder with a substantially consistent degree of accuracy regardless of the shape of the powder particles.

These and other objects and advantages of my invention will more fully appear from the following description made in connection with the accompanying drawings wherein like reference characters refer to the same parts throughout the several views and in which:

FIG. 1 is a side elevation view of the invention, being shown partly broken away and in section for clarity of detail;

FIG. 2 is a detail section view taken approximately at 2—2 in FIG. 1; and

FIG. 3 is a detail section view taken approximately at 3—3 in FIG. 1.

One form of the present invention is shown in the drawings and is described herein.

The powder measuring device is indicated in general by numeral 10 and includes a hopper portion 11 upon which may be placed a jar or other open-bottomed container 12 for maintaining a continuous supply of powder available to the hopper 11. The hopper 11 has downwardly converging sidewalls 13 and an asymmetrically formed opening 15 at the lower edges of the hopper walls. The opening 15 at the bottom of the hopper is closed by a rotor 16, the cylindrical periphery of which engages the lower edges of the hopper walls 13 at the opening 15 in a sealing relation sufficient to permit outward passage of powder particles therebetween. The cylindrical periphery of the rotor 16 is journalled in frame portions 17 adjacent the opposite ends of the rotor. A downwardly extending pipe-like portion 18 is formed integrally with the hopper 11 and is disposed below the opening in the bottom thereof.

The rotor 16 is provided with an opening 19 in the upper peripheral portion thereof so as to receive powder from the hopper 11. The opening in the rotor extends diammetrically across the rotor through the opposite sides thereof. A rigid tube 20 is inserted into the opening 19 of the hopper and extends substantially completely therethrough and has an internal cylindrical shape identical to the shape of the small-sized opening 19 in the rotor. The tube 20 has a threaded lower end 21, and a substantially cylindrical piston 22 is disposed within the tube 20 and is slidable and rotatable therein. The piston 22 has a flattened peripheral portion 23 upon which scale markings are impressed.

A rotary and externally knurled nut 24 is threaded on the lower end of the tube 20 and has a downwardly extending reduced and externally threaded portion 25 which is longitudinally cut at several places around the periphery thereof as at 26 so as to define a plurality of flexible fingers 27 which are inwardly and outwardly movable to a limited degree and which have wedge-shaped exterior shapes to be moved inwardly under the influence of the downwardly convergent interior surface of the clamping nut 28 threaded on the lower portion of nut 24.

It will be seen that the tube 20 has a scale marking 29 on its periphery, immediately above the nut 24, and that the nut 24 also has scale markings on its upper surface 24a so that the cooperating scale markings on the nut and tube can be simultaneously read, thereby facilitating accurate positioning of the nut with respect to the tube and thereby accurately positioning the piston 22 with respect to the tube and with respect to the opening in the rotor.

A handle 30 is affixed to the rotor as by screws 31 in order to rotate the rotor to the dotted line position B seen in FIG. 1 so as to cause powder collected in the upper end of the tube 20 to be spilled downwardly through the discharge port 18.

It will be seen that during the operation of the powder measuring device, the position of the piston 22 may be quickly and easily adjusted by loosening the nut 28 on nut 24, whereupon the piston may be positioned so that the desired scale marking will be disposed at the end of the gripping fingers 27. The nut 28 will then be tightened again. In order to obtain a fine adjustment in the positioning of piston 20, the nut 24 will be rotated on the tube 20.

As the powder flows downwardly through the hopper and over the ledge portions defined by the upper periphery of rotor 16 and into the opening 19 of the rotor, a desired volume of powder is measured in the space within the tube 20 and above piston 22. The non-linear passage of the powder over the peripheral portions of the rotor periphery adjacent the opening 19 causes the powder to be separated into its normal particle sizes and thereby causes an accurate measure of the powder to be obtained within the interior of tube 20, without any open or void spaces being present. It will further be noted that because the opening in the rotor is substantially smaller than the opening 15 at the bottom of the hopper, a very substantially reduced length of edge around the periphery of opening 19 is presented and therefore a substantially reduced number of powder particles are sheared during the rotation movement of the rotor.

It will, of course, be understood that various changes may be made in the form, details, arrangement and proportions of the parts without departing from the scope of my invention which consists of the matter shown and described herein and set forth in the appended claim.

What I claim is:

A powder measuring device including a body member having an upper portion defining a hopper with an open bottom and also having a lower portion defining a discharge port disposed below said open bottom of the hopper, said body also having an intermediate portion, a rotor journalled on said intermediate portion for rotation about a horizontal axis and having a substantially cylindrical periphery, one portion of said periphery facing upwardly at said open bottom of the hopper, an upright cylindrical opening in said rotor and extending through said one portion of the periphery and also through a second portion of the periphery across from said one portion, a rigid tube having an upper end in said opening and spaced from said periphery and said tube also having a lower end extending downwardly therefrom, said tube also having a cylindrical interior flush with the interior of the rotor opening to thereby provide an extension of the rotor opening to the lower end of the tube, said rotor being rotatable to move said one portion and said opening into communicating relation with said discharge port while inverting the tube to empty the contents thereof into the port, a piston mounted for sliding and rotating motion in said tube, the lower end of said tube having external threads thereon, and a nut threaded on the lower end of said tube, said nut having a lower portion surrounding and gripping said piston in snug-fitting relation and defining a plurality of inwardly and outwardly flexing piston-gripping fingers with wedge-shaped exterior surfaces, means movable longitudinally along the nut and along said wedge-shaped fingers for constricting said fingers against the piston and holding the piston in predetermined position.

References Cited in the file of this patent

UNITED STATES PATENTS

| | | |
|---|---|---|
| 953,933 | Tucker | Apr. 5, 1910 |
| 1,291,711 | Auer | Jan. 21, 1919 |
| 2,550,827 | Lachmiller | May 1, 1951 |